US009292221B2

United States Patent
Wang et al.

(10) Patent No.: US 9,292,221 B2
(45) Date of Patent: Mar. 22, 2016

(54) BI-DIRECTIONAL COPYING OF REGISTER CONTENT INTO SHADOW REGISTERS

(75) Inventors: Cheng Wang, San Ramon, CA (US); Youfeng Wu, Palo Alto, CA (US); Jaewoong Chung, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 141 days.

(21) Appl. No.: 13/995,943

(22) PCT Filed: Sep. 29, 2011

(86) PCT No.: PCT/US2011/054098
§ 371 (c)(1),
(2), (4) Date: Jun. 19, 2013

(87) PCT Pub. No.: WO2013/048420
PCT Pub. Date: Apr. 4, 2013

(65) Prior Publication Data
US 2013/0275700 A1    Oct. 17, 2013

(51) Int. Cl.
*G06F 3/06* (2006.01)
*G06F 9/30* (2006.01)
*G06F 9/38* (2006.01)

(52) U.S. Cl.
CPC ............ *G06F 3/065* (2013.01); *G06F 9/30116* (2013.01); *G06F 9/30123* (2013.01); *G06F 9/3863* (2013.01)

(58) Field of Classification Search
None
See application file for complete search history.

(56) References Cited

U.S. PATENT DOCUMENTS

| 6,243,804 | B1 | 6/2001 | Cheng |
| 6,751,749 | B2 * | 6/2004 | Hofstee et al. ................. 714/11 |
| 7,305,665 | B2 * | 12/2007 | Koseki et al. ................. 717/140 |
| 7,694,025 | B1 | 4/2010 | Norrie |
| 7,844,804 | B2 | 11/2010 | Rychlik |
| 2003/0023836 | A1 | 1/2003 | Catherwood et al. |
| 2003/0033509 | A1 | 2/2003 | Leibholz et al. |
| 2006/0112261 | A1 | 5/2006 | Yours et al. |
| 2006/0277396 | A1 | 12/2006 | Renno et al. |
| 2008/0016325 | A1 * | 1/2008 | Laudon et al. ................. 712/217 |
| 2012/0005461 | A1 * | 1/2012 | Moir et al. .................... 712/228 |

FOREIGN PATENT DOCUMENTS

| CN | 1365463 A | 8/2002 |
| CN | 1507609 A | 6/2004 |

(Continued)

OTHER PUBLICATIONS

International Preliminary Report on Patentability mailed Apr. 10, 2014 for International Application No. PCT/US2011/054098, 6 pages.
International Search Report and Written Opinion mailed May 7, 2012 for International Application No. PCT/US2011/054098, 9 pages.

(Continued)

*Primary Examiner* — Mardochee Chery
*Assistant Examiner* — William E Baughman
(74) *Attorney, Agent, or Firm* — Schwabe, Williamson & Wyatt, P.C.

(57) ABSTRACT

Embodiments of the present disclosure describe a processor, which may include copy circuitry coupled to a shadow register file and a control register. The copy circuitry may be configured to copy content from a range of a number of registers to a shadow range of the shadow register file in a forward or backward direction. The forward or backward direction may be based at least in part on a value stored in the control register.

23 Claims, 4 Drawing Sheets

(56) References Cited

FOREIGN PATENT DOCUMENTS

| CN | 1993945 A | 7/2007 |
| CN | 101356497 A | 1/2009 |
| KR | 20130040160 A | 4/2013 |

OTHER PUBLICATIONS

Supplementary European Search Report issued May 6, 2015 for European Application No. 11873137.1, 5 pages.
Extended European Search Report mailed Sep. 28, 2015 for European Application No. 14733495.7, 5 pages.

* cited by examiner

BI-DIRECTIONAL COPYING OF REGISTER CONTENT INTO SHADOW REGISTERS

CROSS REFERENCE TO RELATED APPLICATIONS

The present application is a national phase entry under 35 U.S.C. §371 of International Application No. PCT/US2011/054098, filed Sep. 29, 2011, entitled "BI-DIRECTIONAL COPYING OF REGISTER CONTENT INTO SHADOW REGISTERS", which designated, among the various States, the United States of America. The Specification of the PCT/US2011/054098 Application is hereby incorporated by reference.

FIELD

Embodiments of the present disclosure generally relate to processors, and more particularly, to processors with circuitry configured to perform bi-directional copying of content of registers into shadow registers.

BACKGROUND

Hardware/Software (HW/SW) co-designed processors often rely on hardware atomic region support to achieve high performance through software dynamic binary optimization. An atomic region generally refers to a region of binary code or computer instructions intended to be completed in sequence without interruption. In dynamic binary optimization, binary codes can be executed in an atomic region and optimized aggressively without considering corner cases such as memory order violation, exception, memory aliasing, etc. If a corner case actually occurs during a transaction, hardware may detect the case and the transaction may be aborted. In this case, an initial state of registers updated or modified by the transaction is restored. Often, this is referred to as rollback.

In order to prepare for possible rollback, hardware often makes a copy or "checkpoint" of registers at entry of the atomic region execution. For example, various HW/SW co-designed processors have implemented an approach utilizing a shadow register file such that at entry of the atomic region execution, an entire register file, e.g., architecture register file, is copied to an entire shadow register file. The data in the shadow register file can be discarded if the atomic region executes and commits successfully. In case of a rollback, the whole shadow register file will be copied back to the whole architecture register file. However, according to the above method, during overlapped atomic region execution, two sets of shadow register files would be needed, effectively doubling the die area and thus the materials and expense associated therewith.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the FIG.s of the accompanying drawings.

DETAILED DESCRIPTION

Figure 1:
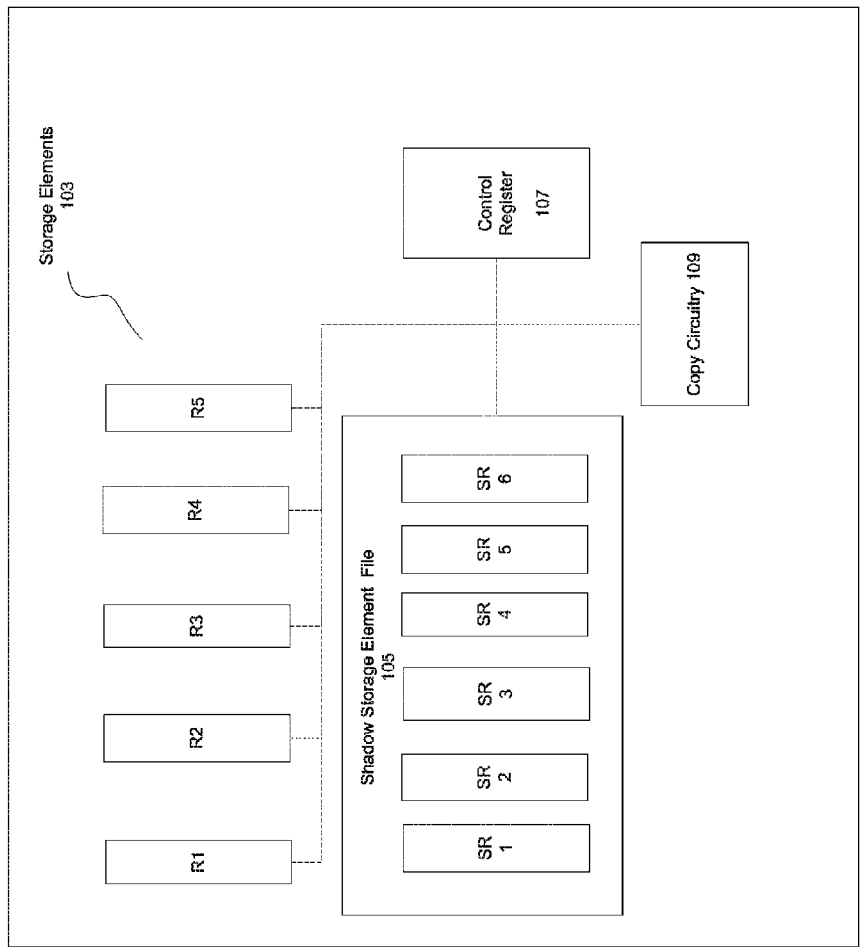
FIG. 1 schematically illustrates an example processor in accordance with some embodiments.

Embodiments of a method and apparatus to provide register checkpointing for overlapped region execution are described herein.

As used herein, "region" refers to a block of code or computer instructions. In some embodiments, the region of code may be an atomic region of code. In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One embodiment provides a processor, which may include a number or plurality of registers, a shadow register file, a control register, and copy circuitry coupled to the shadow register file and the control register. The copy circuitry may be configured to copy content from some or all of a range of the number of registers to a shadow range of the shadow register file in a first or second selected direction. According to embodiments, the method may include specifying the range of architectural registers to be copied to the shadow range of shadow registers.

In embodiments, the first or second selected direction may be based at least in part on a value to be stored in the control register. In an embodiment, the first selected direction may be a forward direction and the second selected direction may be a reverse or backward direction. In embodiments, the range of registers may include a first range of registers, M1, for use in execution of a first region of code and a second range of registers, M2, for use in execution of a second region of code. In an embodiment, M1 may be determined by a register that needs a shadow register and that has a relatively higher register number. In an embodiment, a number of registers in the first range M1 and a number of registers in the second range M2 together may exceed a number of registers in the shadow register file. In embodiments, the first range of registers may include a range of [1, M1] and the second range includes a range of [N, N−M2+1], wherein N is a number of registers in a shadow register file. According to some embodiments, copy circuitry may be configured to copy content from a range of registers to shadow registers in two stages.

According to one embodiment, a method may include assigning respective priorities to a number of architectural registers, based at least in part on respective statuses of the architectural registers. The method may also include allocating the architectural registers for execution of an atomic region, based at least in part on the assigned priorities of the architectural registers, to reduce a range of the architectural registers to be copied to a range of shadow registers. The embodiment may further include determining the respective statuses of the architectural registers, based at least in part on a probability of need for a shadow register by one or more of the architectural registers. Thus, in an embodiment, assigning respective priorities to the number of architectural registers may include assigning a first priority to register that is dead at an entry to the atomic region that is higher than a second priority assigned to a register that is live at the entry to the atomic region.

According to one embodiment, determining the respective statuses of the architectural registers may include determining the respective statuses based at least in part on a register number of one or more of the architectural registers.

According to one embodiment, determining the respective statuses of the architectural registers may include determining the respective statuses based at least in part on a respective order of a modification of one or more of the architectural registers. Note that in another embodiment, priorities may be assigned to virtual registers used in the atomic region. In one example, virtual registers that are dead at entry can be assigned to architectural registers that do not to be shadowed.

According to another embodiment, a system is disclosed, which may include a processor including a number of registers, a shadow register file, and a control register. In the system, copy circuitry may be coupled to the shadow register file and the control register, and configured to copy content from some or all of a range of the number of registers to a shadow range of the shadow register file in a first or second selected direction. The first or second selected direction may be based at least in part on a value stored in the control register. The system may further include a memory having a non-transitory computer readable medium with instructions executable to cause the processor to assign respective priorities to each of the number of registers, based at least in part on respective statuses of the registers. In response, the processor may also allocate the registers for execution of an atomic region, based at least in part on the assigned priorities of the registers, to reduce a range of the registers to be copied to the shadow range of the shadow register file.

As noted above, registers or storage elements updated and/or utilized during execution of a region may need to be backed-up, i.e., checkpointed, to ensure original register states are capable of being restored upon an abort of an execution of the region or transaction. Thus, a register or storage element may be copied to a corresponding shadow register or storage element. Thereafter, the storage element can be considered to be "checkpointed." In one embodiment, the storage element may be checkpointed if it is modified during execution of the region.

FIG. 1 illustrates an example processor 100 which may utilize overlapped region execution in accordance with an embodiment. Due to memory consistency issues, a region often cannot commit until store cache misses in the region are resolved. Thus, to tolerate latency that may occur at an end of region execution, a two-stage commit technique allows a next region to start execution before a previous region commits. Since shadow registers for a region cannot be released until the region commits, overlapped region execution would require two sets of shadow register files. Thus, in accordance with embodiments described below, bidirectional copying of architectural register content to a shadow register file may reduce a number of shadow register files needed for overlapped region execution so that two or more sets of shadow register files may not be required. In the embodiment shown, processor 100 includes a number of storage elements 103, a shadow storage element file 105, a control register 107, and copy circuitry 109.

In the embodiment of FIG. 1, a number of storage elements 103 may include, for example, a number of architecture/architectural registers including registers R1-R5. Note that in various embodiments, a storage element may include not only a hardware register but an abstract register, a virtual register, a memory location, and a memory location in a program stack. Note that a processor may be capable of renaming language referenced virtual registers to registers internal to the processor.

Shadow storage element file 105 may include a shadow register file including, for example, shadow registers SR1-SR6. In embodiments, copy circuitry 109 may be coupled to one or more of each of storage elements 103, shadow storage element file 105 and control register 107. In embodiments, copy circuitry 109 may be configured to copy content from some or all of a range of the storage elements 103 or architecture registers to a shadow range of shadow storage element file 105 in a forward direction or, alternatively, in a backward direction. In embodiments, whether content is copied in the forward direction or backward direction may be based at least in part on a value stored in control register 107. In embodiments, hardware can use one bit to control the forward or backward direction which may be flipped upon region execution. In embodiments to be discussed further below, respective priorities may be assigned to each of the architecture registers, R1, R2, R3, R4 or R5, based at least in part on respective statuses of the architecture registers. In embodiments, the architecture registers may be allocated for execution of an atomic region, based at least in part on the assigned priorities of the architecture registers to reduce a range of architecture registers to be copied to a range of shadow registers.

Note that specific connections of the elements shown in FIG. 1 are only an example. Alternative/additional elements and/or other configurations of storage elements, control register, and/or copy circuitry may be used in some other embodiments. Similarly, although storage elements 103 are illustrated as including four architecture registers and shadow storage element file 105 as including six shadow registers, in other embodiments, a number of architecture registers and a number of shadow registers in the respective numbers may vary.

Figure 2:
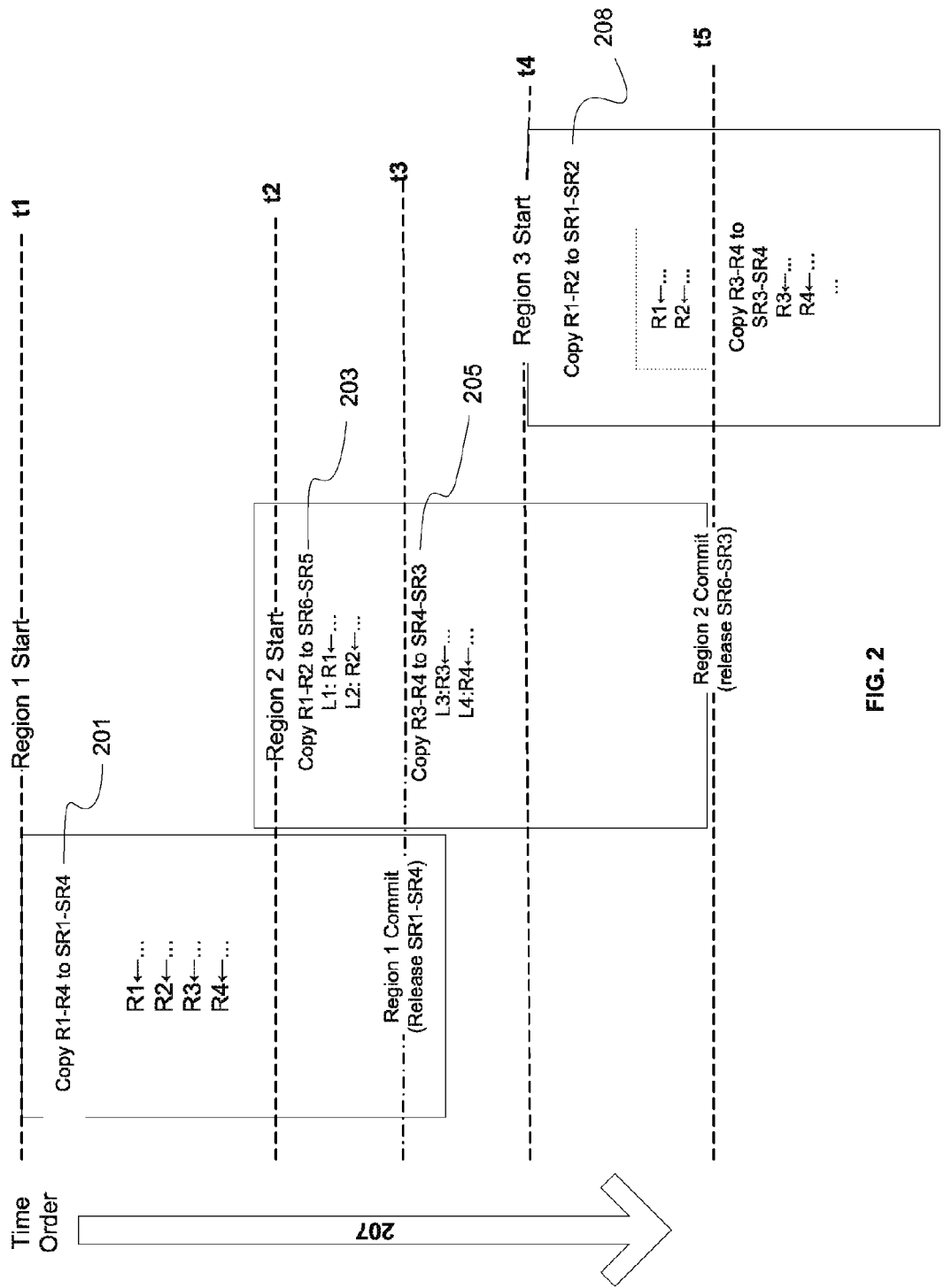
FIG. 2 schematically illustrates an example of overlapped region execution in accordance with some embodiments.

FIG. 2 schematically illustrates an example of overlapped region execution associated with a processor such as for example, processor 100, of FIG. 1, in accordance with some embodiments. Regions 1, 2, and 3 illustrated in FIG. 2 each represent an example block or sequence of code that may execute according to an overlapping time progression 207. As noted previously, architecture registers modified during region execution may need to be backed-up, i.e., checkpointed, to ensure that original architecture register states may be restored upon an abort of region execution. Thus, in an embodiment, software may specify a range [1, M] of architecture registers to be copied to a shadow range of checkpoint or shadow registers [1, M]. Note that in embodiments, software, rather than hardware, may specify the range [1, M] of architecture registers because it may be difficult for the hardware to scan a region to determine which architecture registers are modified and live. In embodiments, after the range has been specified by software, hardware may checkpoint architecture registers [1, M] to corresponding shadow registers to allow region execution. In embodiments, the hardware may stall the region execution in order to avoid modifying a register that has not yet been checkpointed. In embodiments, copying only architecture registers in a particular range, rather than all architecture registers, may reduce stalls related to unavailable shadow registers and reduce unnecessary copying between architecture registers and shadow registers.

In the example embodiment of FIG. 2, each of Regions 1, 2, and 3 have an example range of [R1, R4] including four architecture registers ("registers") R1, R2, R3, and R4 of each respective region, that has been specified to be copied to a shadow range of [SR1, SR4] shadow registers. In an embodiment, M may be a register having a largest or higher register number of registers live at entry of each of the regions that is to be modified. The shadow register file, such as, for example, shadow storage element file 105 of FIG. 1, may include an example six registers, SR1-SR6. In the embodiment, at an entry of Region 1 shown by a dotted line at t1, copy circuitry such as for example copy circuitry 109 of FIG. 1, may copy registers of a range [1, M1] or [R1,R4] of Region 1 to shadow registers SR1-SR4 at 201 in a forward direction. Note that due to possible memory consistency issues as noted above, a region may be unable to commit its execution results until all store cache misses in the region are resolved. Thus, in embodiments, a two-stage commit may allow a region to start execution before a previous region commits. Thus, in the illustrated embodiment, before Region 1 commits, a processor can start execution of Region 2 at t2. At entry of Region 2, copy circuitry 109 may begin to copy content from range [1,M2] or [R1,R4] of Region 2 to available shadow registers in the shadow register file. In the embodiment, in order to utilize available shadow registers in the shadow register file, copy circuitry now may copy content from registers R1-R4 in a backward direction, to shadow registers SR6-SR3. Thus, in an embodiment, Region 2 with a shadow range of [1, M2] or, in this example, [R1, R4], may copy registers [R1, R4] to shadow registers [N, N−M2+1] or [SR6, SR3] if N is a number of registers in the shadow register file.

If, as in this example, M1+M2>N, or in other words, a total number of registers in the first and the second ranges of respective Regions 1 and 2 together exceed a number of shadow registers in the shadow register file, a "two-stage shadowing" may be utilized. Since at t2, Region 1 has not yet committed, shadow registers SR3-SR4 might be unavailable for use by Region 2 since they may still be utilized by Region 1. Thus, copy circuitry may copy the registers of Region 2 to the shadow registers in two stages. Region 2 may begin execution as long as no register larger than N−M1 is modified. In embodiments, only registers [1, N−M1] or R1-R2 of Region 2 may be copied to shadow registers [N, M1+1] or SR6-SR5 in a first stage at 203. Note that in the embodiment, between t2 and t3, since registers R3 and R4 for Region 2 have not yet been copied to shadow registers, if an instruction attempts to modify registers R3 and/or R4, the processor may stall the execution of Region 2 until Region 1 commits. Once Region 1 commits at t3, shadow registers [SR1, SR4] may be released. Thus, copy circuitry 109 may copy a remainder of the registers [N−M1+1, M2] or R3-R4 in the range of registers for Region 2 to shadow registers [M1, N−M2+1] or SR4-SR3 in a second-stage at 205.

Accordingly, Region 2 may proceed to finish execution on or after t3. In a similar manner, in the embodiment shown, before Region 2 commits its execution results, the processor can start the execution of Region 3 at t4. In the embodiment, at entry of Region 3, copy circuitry may copy registers of Region 3 in a forward direction. In some embodiments, copy circuitry may copy all of registers R1-R4 to shadow registers SR1-SR4. However, in the embodiment shown, shadow registers SR3-SR4 may still be used by Region 2. Thus, copy circuitry only copies registers R1-R2 for Region 3 to shadow registers SR1-SR2 at 208 in a first-stage, allowing Region 3 execution to begin. Because registers R3-R4 have not been copied to shadow registers for Region 3, during the execution of Region 3, if an instruction attempts to modify Registers R3-R4, processor 100 may stall the instruction execution until Region 2 commits. Once Region 2 commits, SR6-SR3 may be released. Thus, after previous Region 2 commits, copy circuitry may then copy the remaining registers R3-R4 to shadow registers SR3-SR4 in a second-stage. In the embodiment, Region 2 may then finish execution without stall.

Thus, as can be seen from the above embodiments, registers in a range of [1, M] may be copied to shadow registers to allow region execution. In embodiments, copying only registers in a particular range, rather than all architecture registers, may reduce stalls related to unavailable shadow registers and reduce unnecessary copying between architecture registers and shadow registers. Note that in embodiments, a direction in which registers are copied to a shadow register file may alternate between a forward direction and a backward direction upon entry of execution to a next region. Furthermore, in embodiments, since each register R may be copied to only one of two shadow registers, R or N−R+1, hardware layouts and bus lines coupling an architecture register file and shadow register file may be greatly simplified. Note that in various embodiments, overlapped region execution may be supported by organizing a shadow register file into a circular queue. In other embodiments, hardware may implement a shadow register file that is a same size as an architecture file and may copy a lower half of architecture registers for overlapped region execution. In the embodiment, only overlapped execution of regions that modify a lower half of the architecture registers may occur. In the embodiment, if a region modifies an upper half of the architecture registers, hardware may prevent the overlapped region execution between the region and a previous or next region.

Additional features of the embodiments include using register allocation that may reduce stalls during execution of one or more regions. Register allocation may be used in specifying and reducing a shadow range [1, M] by minimizing or reducing a number of architecture registers modified inside the region which may in some embodiments reduce power consumption in shadow registers as well as reduce pipeline stalls. Embodiments may also shorten a duration of or prevent pipeline stalls where a total number of registers in first and second ranges of respective Regions 1 and 2 together may exceed a number of registers in a shadow register file. In embodiments, software may perform the register allocation which includes allocating architectural registers to the virtual registers used during optimizations.

Figure 3:
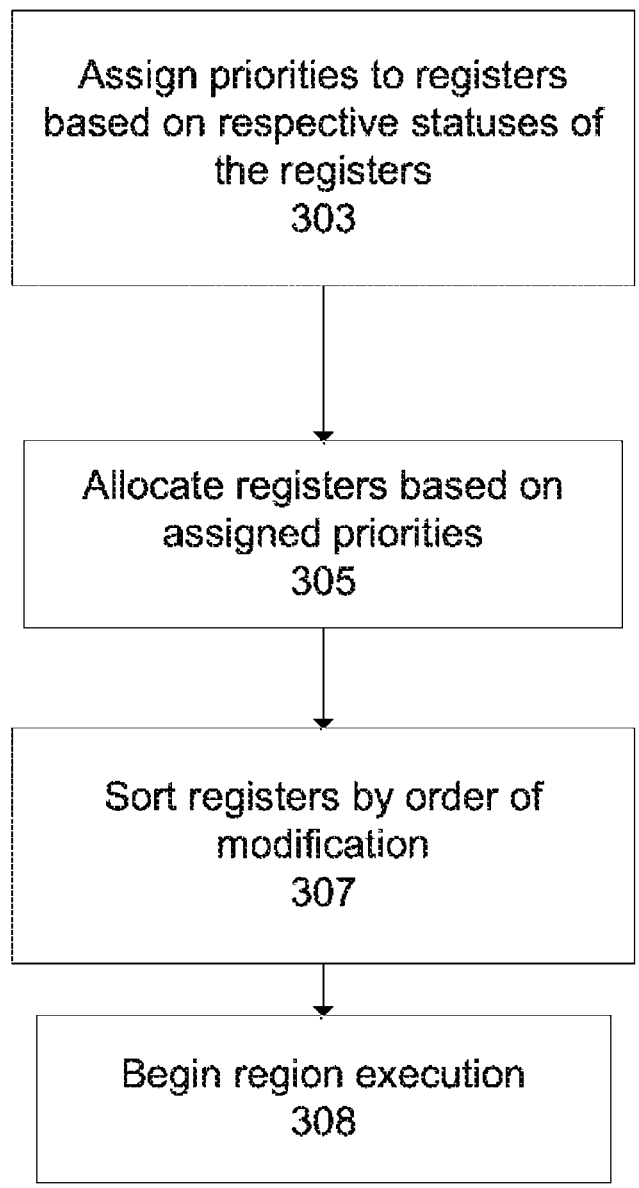
FIG. 3 is a flow diagram of a method for allocating architectural registers to virtual registers in accordance with some embodiments.

Thus, referring now to FIG. 3, which is a flow diagram of a method 300 for allocating registers in accordance with some embodiments. In the embodiment shown, at a first block 303, a processor, such as processor 100 of FIG. 1, may assign respective priorities to each of a number of registers such as each of a number of storage elements 103 of FIG. 1, based at least in part on respective statuses of the registers. In some embodiments, the respective statuses may be determined based at least in part on a probability of need for a shadow register by one or more of the registers. For example, a higher priority may be assigned to a register dead at an entry to an atomic region than register live at the entry to the atomic region because the register live at the entry of the atomic region may need a shadow register while the register that is dead at the entry to the atomic region does not. In other embodiments, the processor may prioritize the respective statuses of the registers based at least in part on a register number of one or more of the registers. Note that since a shadow range M may be determined by the register having a relatively higher number out of those registers that needs a shadow register, to reduce the shadow range M, an architecture register with a smaller register number may be assigned a higher priority so the architecture register with the smaller register number may be more frequently allocated.

Next, at a second block 305, the processor may allocate the registers for execution of the atomic region based at least in part on the assigned priorities of the registers to reduce a range of registers to be copied to a range of shadow registers. Accordingly, a register with a higher priority may be allocated before a register with a lower priority. Thus, in embodiments, stalling during execution may be reduced or eliminated by reducing a shadow range where a number of registers in a first range and a second range of a respective first and second region exceed a number of registers in the shadow register file (e.g., M1+M2>N). Furthermore, at a next block 307, allocated registers may then be sorted by order of modification. For example, if R1 has higher priority than register R2, but the first modification to R2 is earlier than the first modification to R1, then R1 may be renamed/re-defined to/as R2 and vice-versa.

At a final block 308, region execution can begin. Thus, in embodiments, shadow register usage for registers that are not modified during execution may be reduced. In embodiments, fewer registers modified in the region in combination with increased shadow registers implemented in the shadow register file may reduce chances that overlapped region execution may be stalled due to an unavailable shadow register. Thus, in embodiments as described above, the processor may be adaptive to a number of registers modified in the regions and the number of shadow registers in the shadow register file.

Figure 4:
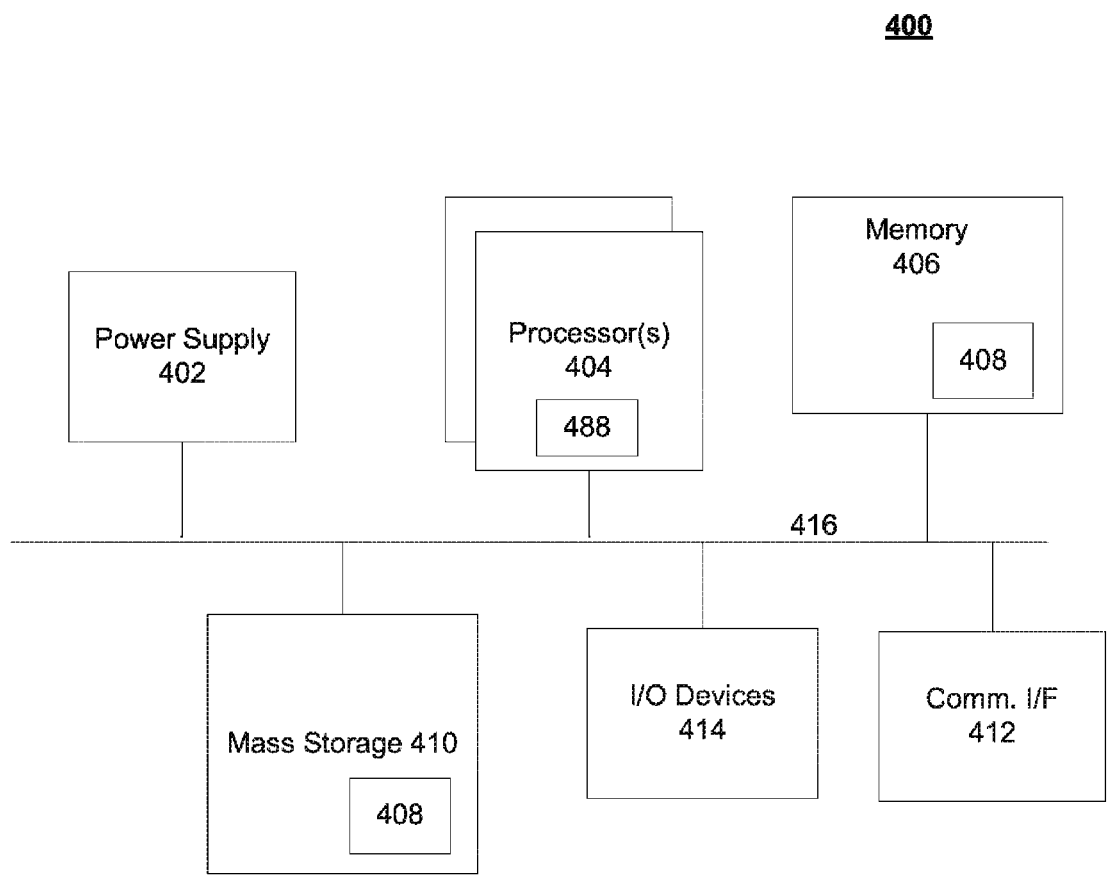
FIG. 4 is a block diagram that illustrates an example computer system suitable to practice the disclosed method and apparatus in accordance with some embodiments.

FIG. 4 is a block diagram that illustrates an example computer system 400 suitable to practice the disclosed apparatus and method of various embodiments. As shown, computer system 400 may include a power supply unit 402, a number of processors or processor cores 404, a non-transient computer-readable storage memory 406 having processor-readable and processor-executable instructions 408 stored therein, a mass storage device 410 that may also store the instructions 408, and a communication interface 412. For the purpose of this application, including the claims, the terms "processor" and "processor cores" may be considered synonymous, unless the context clearly requires otherwise.

In various embodiments of the present disclosure, at least one of the processors 404 may include a number of elements 488 including for example a number of storage elements, a shadow storage element file, a control register, and copy circuitry such as, for example described in connection with FIG. 1. In an embodiment, copy circuitry, such as copy circuitry 109 of FIG. 1, may be configured to copy content from some or all of a range of the number of storage elements to a shadow range of the shadow register file in a first or second selected direction.

In embodiments, the one or more mass storage devices 410 and/or the memory 406 may include a tangible, non-transitory computer-readable storage device (such as a diskette, hard drive, compact disc read only memory (CDROM), hardware storage unit, and so forth). The computer system 400 may also include input/output devices 414 (such as a keyboard, display screen, cursor control, and so forth). In embodiments, the various elements of FIG. 4 may be coupled to each other via a communication pathway 416, which may represent a bus such as a multi-drop bus or a point-to-point interconnect. In the case of multiple buses, they may be bridged by one or more bus bridges (not shown). Data may pass through the communication pathway 416 through the I/O devices 414, for example, between the component(s) 418 and the processors 404.

The memory 406 and the mass storage device 410 may be employed to store a working copy and a permanent copy of the programming instructions implementing one or more operating systems, firmware modules or drivers, applications, and so forth, herein collectively denoted as 408. The permanent copy of the programming instructions may be placed into permanent storage in the factory, or in the field, through, for example, a distribution medium (not shown), such as a compact disc (CD), or through the communication interface 412 (from a distribution server (not shown)).

The remaining constitution of the various elements of the computer system 400 is known, and accordingly will not be further described in detail. It is further noted that an article of manufacture is disclosed herein. The article of manufacture may include a non-transient computer-readable medium having instructions stored thereon, which if executed, result in the actions described herein. The non-transient computer-readable medium may include, for example, components of memory 406 and/or the mass 410 or any other suitable storage medium.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A processor comprising:
   a plurality of registers;
   a shadow register file with a plurality of shadow registers;
   a control register; and
   copy circuitry coupled to the plurality of registers, the shadow register file and the control register, to copy content from some or all of a range of the plurality of registers to a shadow range of the shadow register file in a first or second selected direction of the shadow registers, wherein the first or second selected direction of the shadow registers is to be based at least in part on a value to be stored in the control register.

2. The processor of claim 1 wherein the first selected direction is a forward direction with increasing shadow register number.

3. The processor or claim 2 wherein second selected direction is a reverse direction with decreasing shadow register number.

4. The processor of claim 1 wherein the range of the plurality of registers includes a first range of registers {1, M1} for use in execution of a first region of code; wherein M1 is an integer less than the total number of shadow registers.

5. The processor of claim 4 wherein the range of the plurality of registers further includes a second range of registers {1, M2} for use in execution of a second region of code; wherein M2 is an integer, and the sum of M1 and M2 is less than the total number of shadow registers.

6. The processor of claim 5 wherein the first range of registers is copied to a shadow range {1, M1} of the shadow registers and the second range is copied to a shadow range of {N, N−M2+1} of the shadow registers, wherein M1, M2 and N are integers; N is the number of shadow registers in the shadow register file; and the sum of M1 and M2 is less than N.

7. The processor of claim 5 wherein a number of registers in the first range and a number of registers in the second range together exceed the number of shadow registers in the shadow register file.

8. The processor of claim 1, wherein the copy circuitry is to copy content from the range of the plurality of registers in two stages.

9. The processor of claim 8, wherein the processor is to start execution of a next region before committing execution results of a previous region.

10. The processor of claim 9, wherein the processor is to stall execution of the next region if an instruction attempts to modify a register having content not checkpointed during a first stage.

11. A method comprising:
assigning, by a processor, respective priorities to each of a plurality of architectural registers of the processor, based at least in part on respective statuses of the architectural registers in the plurality, wherein the processor is a physical processor of computing device;
respectively allocating, by the processor, first and second subsets of the architectural registers for execution of first and second atomic regions, based at least in part on the assigned priorities of the architectural registers; and
copying, by the processor, first and second ranges of the first and second subsets of the architectural registers to first and second ranges of shadow registers of the processor, wherein the total number of the first and second subsets of the architecture registers is greater than the number of shadow registers, but the total number of the first and second ranges of the first and second subsets being copied is less than the total number of the first and second subsets of the architecture registers, and less than the total number of shadow registers.

12. The method of claim 11 further comprising determining, by the processor, the respective statuses of the architectural registers, based at least in part on a probability of need for a shadow register by one or more of the architectural registers.

13. The method of claim 11 further comprising determining, by the processor, the respective statuses of the architectural registers, based at least in part on a register number of one or more of the architectural registers.

14. The method of claim 11 further comprising determining, by the processor, the respective statuses of the architectural registers, based at least in part on a respective order of a modification of one or more of the architectural registers.

15. The method of claim 11 wherein assigning respective priorities to the plurality of architectural registers comprises assigning, by the processor, a first priority to a register that is dead at an entry to the atomic region that is higher than a second priority assigned to a register that is live at the entry to the atomic region.

16. The method of claim 11 further comprising specifying, by the processor, the first and second ranges of architectural registers to be copied to the first and second ranges of shadow registers.

17. A system, comprising:
a processor including:
a plurality of registers;
a shadow register file having a plurality of shadow registers; and
a control register;
copy circuitry coupled to the shadow register file and the control register, to copy content from some or all of a range of the plurality of registers to a shadow range of the shadow register file in a first or second selected direction of the shadow registers, wherein the first or second selected direction of the shadow registers is based at least in part on a value stored in the control register; and
a memory including a non-transitory computer readable medium having instructions executable to cause the processor to:
assign respective priorities to the registers, based at least in part on respective statuses of the registers;
respectively allocate first and second subsets of the registers for execution of first and second atomic regions, based at least in part on the assigned respective priorities of each of the plurality of registers; and
copy first and second ranges of the first and second subsets of the registers to first and second ranges of the shadow register file, wherein the total number of the first and second subsets of the registers is greater than the number of shadow registers but the total number of the first and second ranges of the first and second subsets being copied is less than the total number of the first and second subsets of the registers, and less than the total number of shadow registers.

18. A non-transitory computer-readable storage medium having instructions stored therein, to cause a processor, in response to execution of the instructions, to:
assign respective priorities to a plurality of architectural registers of the processor, based at least in part on respective statuses of the architectural registers;
respectively allocate first and second subsets of the architectural registers for execution of first and second atomic regions, based at least in part on the assigned respective priorities of the architectural registers; and
copy first and second ranges of the first and second subsets of the architectural registers to first and second ranges of shadow registers of the processor, wherein the total number of the first and second subsets of the registers is greater than the number of shadow registers, but the total number of the first and second ranges of the first and second subsets being copied is less than the total number of the first and second subsets of the registers, and less than the total number of shadow registers.

19. The storage medium of claim 18, wherein the instructions are to further cause the processor, in response to execution by the processor, to determine the respective statuses of the architectural registers, based at least in part on a probability of need for a shadow register by one or more of the architectural registers.

20. The storage medium of claim 18, wherein the instructions are to further cause the processor, in response to execution by the processor, to determine the respective statuses of the architectural registers, based at least in part on a register number of one or more of the architectural registers.

21. The storage medium of claim 18, wherein the instructions are to further cause the processor, in response to execution by the processor, to determine the respective statuses of the architectural registers, based at least in part on a respective order of a modification of one or more of the architectural registers.

22. The storage medium of claim 18, wherein assign respective priorities to the plurality of architectural registers comprises assign a first priority to a register dead at an entry to the atomic region that is higher than a second priority assigned to a live-in register at the entry to the atomic region.

23. The storage medium of claim 18, wherein the instructions are to further cause the processor, in response to execution by the processor, to specify the first and second ranges of the first and second subsets of architectural registers to be copied to the first and second ranges of shadow registers.

* * * * *